United States Patent
Hillier et al.

(10) Patent No.: US 11,349,974 B2
(45) Date of Patent: May 31, 2022

(54) METHOD AND SYSTEM FOR PROVIDING CALLER INFORMATION

(71) Applicant: Mitel Networks Corporation, Ottawa (CA)

(72) Inventors: Katayoun Hillier, Ottawa (CA); Peter Hillier, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 6 days.

(21) Appl. No.: 16/392,133

(22) Filed: Apr. 23, 2019

(65) Prior Publication Data

US 2019/0253546 A1 Aug. 15, 2019

Related U.S. Application Data

(63) Continuation of application No. 15/040,756, filed on Feb. 10, 2016, now Pat. No. 10,306,042.

(51) Int. Cl.
*H04M 1/57* (2006.01)
*H04M 3/42* (2006.01)
*G10L 15/26* (2006.01)
*G06F 40/53* (2020.01)

(52) U.S. Cl.
CPC ............ *H04M 1/578* (2013.01); *G06F 40/53* (2020.01); *G10L 15/26* (2013.01); *H04M 3/42042* (2013.01); *H04M 3/42076* (2013.01); *H04M 1/576* (2013.01); *H04M 2201/60* (2013.01); *H04M 2203/2061* (2013.01); *H04M 2203/306* (2013.01); *H04M 2203/651* (2013.01)

(58) Field of Classification Search
CPC ......... H04M 1/578; G06F 40/53; G10L 15/26
See application file for complete search history.

(56) References Cited

U.S. PATENT DOCUMENTS

| | | | |
|---|---|---|---|
| 5,329,578 A | 7/1994 | Brennan et al. | |
| 5,590,188 A | 12/1996 | Crockett | |
| 5,754,627 A | 5/1998 | Butler et al. | |
| 6,301,608 B1 | 10/2001 | Rochkind | |
| 6,301,609 B1 | 10/2001 | Aravamundan et al. | |
| 6,421,439 B1 | 7/2002 | Liffick | |
| 6,700,967 B2 | 3/2004 | Kleinoder et al. | |
| 7,443,964 B2 * | 10/2008 | Urban | H04W 4/14 379/88.23 |
| 8,009,812 B2 | 8/2011 | Bruce et al. | |
| 8,073,121 B2 * | 12/2011 | Urban | H04W 4/14 379/142.01 |

(Continued)

FOREIGN PATENT DOCUMENTS

| | | |
|---|---|---|
| EP | 0 510 411 B1 | 3/1992 |
| EP | 1211875 A2 | 6/2002 |

(Continued)

*Primary Examiner* — Peter D Nolan
*Assistant Examiner* — Ce Li Li

(57) ABSTRACT

Methods and systems of providing caller information are provided. Exemplary systems and methods provide location information for audio files including the caller information. The location information can be used to retrieve the audio information, which can be played on a call recipient's device, and/or a translation of the audio information, which can be displayed on the call recipient's device.

20 Claims, 3 Drawing Sheets

(56) References Cited

U.S. PATENT DOCUMENTS

| | | | |
|---|---|---|---|
| 8,428,227 B2* | 4/2013 | Angel | G10L 15/26 379/68 |
| 8,879,701 B2* | 11/2014 | Phadnis | H04M 3/42042 379/142.01 |
| 9,203,954 B1* | 12/2015 | Van Rensburg | H04M 3/42042 |
| 9,444,946 B2* | 9/2016 | White | H04M 15/06 |
| 9,871,930 B2* | 1/2018 | Laasik | H04L 65/1069 |
| 2002/0034286 A1 | 3/2002 | Crockett et al. | |
| 2002/0094067 A1* | 7/2002 | August | G10L 13/00 379/88.01 |
| 2002/0196914 A1* | 12/2002 | Ruckart | H04M 3/02 379/88.21 |
| 2003/0037113 A1 | 2/2003 | Petrovykh | |
| 2003/0110039 A1* | 6/2003 | Brown | G10L 17/00 704/273 |
| 2003/0128821 A1 | 7/2003 | Luneau et al. | |
| 2003/0215074 A1* | 11/2003 | Wrobel | H04M 1/57 379/142.04 |
| 2004/0037403 A1* | 2/2004 | Koch | H04M 1/56 379/142.16 |
| 2004/0073423 A1* | 4/2004 | Freedman | G10L 13/08 704/235 |
| 2004/0203835 A1 | 10/2004 | Trottier et al. | |
| 2004/0209605 A1* | 10/2004 | Urban | H04W 4/14 455/415 |
| 2004/0261115 A1 | 12/2004 | Bartfeld | |
| 2005/0063365 A1 | 3/2005 | Mathew et al. | |
| 2005/0149335 A1 | 7/2005 | Mesbah et al. | |
| 2005/0246628 A1 | 11/2005 | Peterson | |
| 2005/0287997 A1 | 12/2005 | Fournier | |
| 2007/0036313 A1 | 2/2007 | White et al. | |
| 2007/0041540 A1* | 2/2007 | Shao | H04N 7/15 379/142.01 |
| 2007/0260456 A1* | 11/2007 | Proux | H04M 1/72552 704/235 |
| 2007/0263791 A1 | 11/2007 | Alperin et al. | |
| 2007/0275708 A1* | 11/2007 | Henderson | H04M 1/2745 455/415 |
| 2008/0037520 A1* | 2/2008 | Stein | H04M 7/0069 370/352 |
| 2008/0101588 A1* | 5/2008 | Bruce | H04M 7/0036 379/373.01 |
| 2008/0233980 A1* | 9/2008 | Englund | G06F 40/58 455/466 |
| 2009/0117886 A1* | 5/2009 | Urban | H04W 4/14 455/415 |
| 2009/0248421 A1* | 10/2009 | Michaelis | H04M 3/42042 704/276 |
| 2011/0286584 A1* | 11/2011 | Angel | H04M 3/42221 379/88.02 |
| 2012/0116766 A1* | 5/2012 | Wasserblat | G10L 15/08 704/254 |
| 2013/0272513 A1* | 10/2013 | Phadnis | H04M 3/42042 379/93.23 |
| 2014/0003298 A1* | 1/2014 | Charugundla | H04M 3/42391 370/259 |
| 2015/0086000 A1* | 3/2015 | Goldstein | H04M 1/72433 379/142.04 |
| 2016/0072947 A1* | 3/2016 | Van Rensburg | H04M 3/42059 455/415 |
| 2016/0366093 A1* | 12/2016 | Narayanan | H04M 7/0075 |

FOREIGN PATENT DOCUMENTS

| | | |
|---|---|---|
| EP | 2107775 A1 | 10/2009 |
| EP | 2600597 A1 | 6/2013 |
| GB | 2 351 870 A | 10/2001 |
| GB | 2 369 529 A | 5/2002 |
| WO | WO 99/26424 | 5/1999 |
| WO | WO 2007/072323 A2 | 6/2007 |

* cited by examiner

METHOD AND SYSTEM FOR PROVIDING CALLER INFORMATION

CROSS REFERENCE TO RELATED APPLICATIONS

This application is a continuation of, and claims priority to, U.S. patent application Ser. No. 15/040,756, filed Feb. 10, 2016, and entitled "Method and System for Providing Caller Information," the contents of which is incorporated herein by reference.

FIELD

This invention relates generally to communication systems, and more particularly to a method and system of providing caller information.

BACKGROUND

Caller identification information allows a call recipient to view caller information. The recipient can view the caller identification information and decide, for example, whether to answer a call, or not, based on the caller identification information.

Typically, caller identification information includes a number of the caller and a name of the caller. Caller identification information can be provided by a call routing engine—e.g., based on account provisioning information. Additionally or alternatively, in some cases, a user (caller) can provide their caller identification information. In these cases, a user can enter a name to be displayed on call recipients' devices.

When a language used by a caller differs from a language used by a call recipient, particularly when an alphabet used by the caller's device or, e.g., the caller's routing engine or the like, differs from an alphabet used by the recipient's device, the caller identification information may not be displayed in a manner that is discernible to the call recipient. The caller identification information may not properly display on the recipient's device and/or may be displayed using characters that are not familiar to the call recipient. As a result, the recipient may not be able to identify the caller and/or determine a context of a call.

Some systems may allow a user (recipient) to store information, such as a caller's name, associated with a phone number on a user's device. However, such systems cannot provide caller identification information for callers not associated with information already stored on the user/recipient device, and such systems require input by the recipient. Other systems do not allow a user/recipient to modify caller identification information. Accordingly, improved systems and methods that allow a recipient to identify a caller are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

Figure 1:
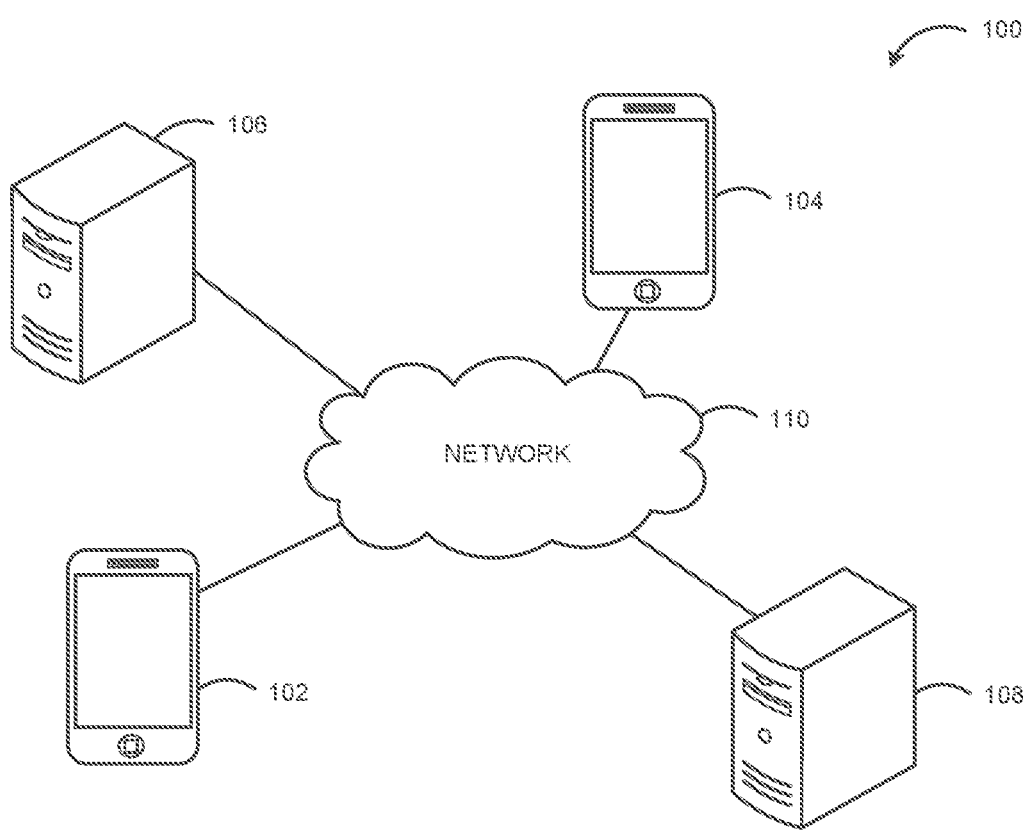
FIG. 1 illustrates a communication system in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within exemplary systems, such connections and couplings can be realized by direct connection between components, or by connection through other components and devices located therebetween. Similarly, unless otherwise noted, illustrative methods can include additional steps and/or steps that are performed in a different order.

Exemplary systems and methods are described below in connection with voice-over-Internet protocols (VoIP), and in some cases with session initial protocol (SIP). However, unless otherwise noted, the disclosure is not limited to such examples.

In accordance with various embodiments of the disclosure, improved methods and systems for providing caller information on a call recipient's device are disclosed. As discussed in more detail below, exemplary methods and systems can be used to provide audio information and/or translated (literally or phonetically) caller information to a call recipient's device. In accordance with illustrate examples, the text can be displayed using the language and alphabet of the call recipient's device—even if the language and/or alphabet used by a caller's device differs from the language and/or alphabet used by a recipient's device.

Exemplary methods of providing caller information include initiating a call between a first device and a second device, providing file location information corresponding to audio information during a call setup between the first device and the second device, using the file location information, retrieving the audio information, and performing one or more of playing the audio information and displaying information on the second device. The file location can be, for example, on the first device or on a server. The audio information can be pre-recorded, using, e.g., the first device. The audio information can then be stored on, for example, the first device or a server. The audio information can be translated into text, such that the text is displayed on the second device using the alphabet used on the second device, which may be different from the alphabet used on the first device. Thus, a caller's name and/or other information can be displayed using the recipient's device alphabet, even if the recipient's device alphabet differs from the caller device's alphabet.

In accordance with yet further embodiments of the disclosure, methods of providing caller information include initiating a call between a first device and a second device, providing file location information corresponding to audio information recorded in a first language using the first device, translating the audio information to a second language, and providing translated information in the second language on the second device. The translated information can include text that is transcribed literally and/or phonetically. The file location information can include a URL address for the audio information. The URL information can correspond to the first device, to a server, or the like.

In accordance with yet additional exemplary embodiments of the disclosure, a system for providing caller information includes a communication network, a first device connected to the communication network, and a second device coupled to the communication network, wherein file location information regarding audio information is provided to the second device during a call setup between the first device and the second device, and wherein the second device performs one or more of displaying translated text corresponding to the audio information and playing the audio information. The system can additionally include a server or the like to store the audio information. Additionally or alternatively, the system can include a server to translate and/or transcribe audio information in a first language to text information (or an image including text) in a second language.

In accordance with further aspects, a computer readable medium having computer readable code embodied therein for controlling a device to perform the steps of providing caller information includes initiating a call between a first device and a second device, providing file location information corresponding to audio information during a call setup between the first device and the second device, using the file location information, retrieving the audio information, and performing one or more of playing the audio information and displaying information on the second device is provided. In accordance with other aspects, a computer readable medium having computer readable code embodied therein for controlling a device to perform the steps of initiating a call between a first device and a second device, providing file location information corresponding to audio information recorded in a first language, translating the audio information to a second language, and providing translated information in the second language on the second device is provided.

In accordance with various aspects of the exemplary embodiments described herein, the caller identification information can be provided as contextual information or as part of contextual information to a user's device, such that the contextual information can be provided (e.g., in text, image, or audio format) along with other caller identification information.

Turning to FIG. 1, a system 100 for providing caller information is illustrated. System 100 includes a first user device 102, a second user device 104, and network 110. System 100 can also optionally include one or more servers 106, 108. Although illustrated with two devices 102, 104, one network 110, and two servers 106, 108, it will be appreciated that systems in accordance with this disclosure can include any suitable number of devices, networks, servers, and/or other network devices.

Devices 102, 104 can include any suitable device with wired and/or wireless communication features. For example, user devices 102, 104 can include a wearable device, a tablet computer, a smart phone, a personal (e.g., laptop or desktop) computer, a streaming device, such as a game console or other media streaming device, such as Roku, Amazon Fire TV, or the like, a mobile station, a subscriber station, a mobile unit, a subscriber unit, a wireless unit, a mobile device, a wireless device, a wireless communication device, an access terminal, a mobile terminal, a handset, a user agent, or other suitable device.

In accordance with various embodiments of the disclosure, one or more of devices 102, 104 include a client to, for example, perform various functions or steps as described herein. As used herein, client can refer to a downloadable OTT application, a native phone application, a soft phone or a browser-based client. The client can, for example, present caller information that has been, for example, transcribed and translated—e.g., from one language using a first alphabet to a second language using a second alphabet. Additionally or alternatively, the client can allow a user to record caller information, such as the caller's name and/or play audio information (e.g., the caller's recorded name) upon a call setup (e.g., in addition to or in lieu of a call ring). In accordance with further exemplary embodiments, the client can translate caller information—e.g., during a call setup. Exemplary clients can allow a user to select a preferred language and/or alphabet for display of caller information received, for example, during a call setup. The client can also provide a suitable graphical user interface (GUI) that can allow playing the audio information (on demand or automatically) and/or displaying the text associated with the caller information. Additional exemplary client functions are described below.

Servers 106, 108 can be any suitable device capable of receiving information from one or more of devices 102, 104, storing the information, and allowing access to the information from one or more of devices 102, 104 and/or other devices and/or transmitting the information to one or more devices. By way of particular examples, servers 106, 108 can be stand-alone servers, private branch exchange (PBX) servers, unified communications servers, part of a cloud service, or the like.

In accordance with exemplary embodiments of the disclosure, server 106 is configured to store audio information that corresponds to caller information (e.g., caller identification information). By way of example, server 106 can store recordings (e.g., in a user's/caller's voice) that can then be transmitted to a call recipient's device—e.g., during a call setup. Alternatively, as discussed in more detail below, such audio information can be stored on the caller's device.

In accordance with further illustrated examples, server 108 is configured to transcribe audio information into text. The translated text can be in a language and using an alphabet of the call recipient's device. As noted above, the translation and transcription of audio information can be literal or phonetic. Although illustrated separately, servers 106, 108 can form part of another system and/or the functions of servers 106/108 can be performed by a single server.

Network 110 can include or be a local area network (LAN), a wide area network, a personal area network, a campus area network, a metropolitan area network, a global area network, or the like. Network 110 can be coupled to other networks, such as a private branch exchange (PBX) network, to other devices typically coupled to a network, and/or to the Internet.

Figure 2:
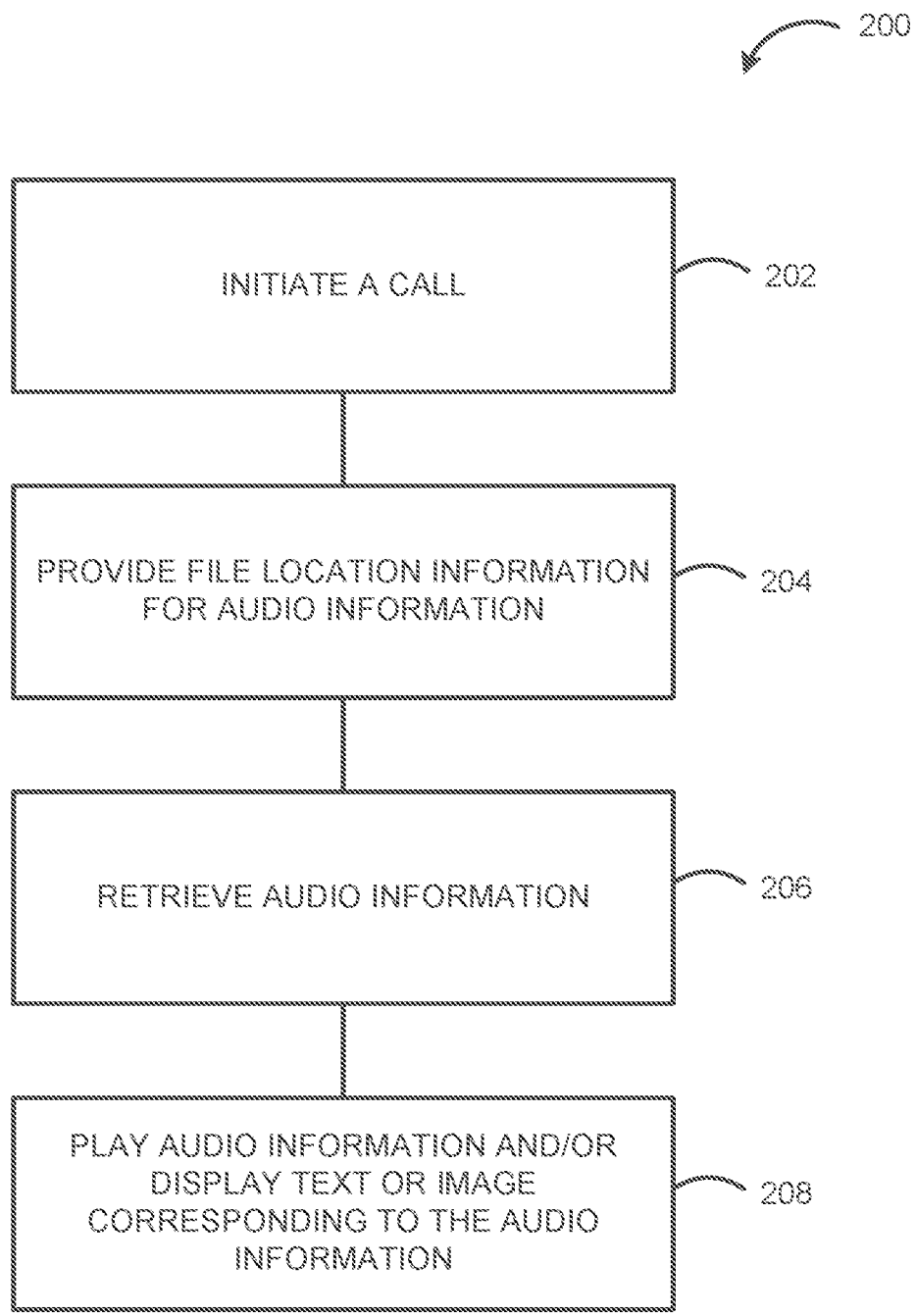
FIG. 2 illustrates a communication method in accordance with exemplary embodiments of the disclosure.

FIG. 2 illustrates a method 200 in accordance with exemplary embodiments of the disclosure. Method 200 includes the steps of initiating a call (step 202), providing file location information for audio information (step 204), retrieving the audio information (step 206), and playing audio information and/or displaying information (step 206).

Step 202 includes initiating a call (e.g., a telephone call, a video call, or a collaboration call) between two or more devices. By way of example, step 202 can include initiating a VoIP call, such as a SIP call.

In accordance with some examples of the disclosure, prior to or at the beginning of step 202, a user (the caller) can use a device (e.g., use a client on the caller's device or another device) to audio record caller information, such as a caller's name, caller's company, information about what the call is about, context information, other caller information, and the like. Examples of how to generate context-aware information are disclosed in U.S. application Ser. No. 15/009,187, entitled METHOD AND SYSTEM OF PROVIDING CONTEXT AWARE ANNOUNCEMENTS, and filed Jan. 28, 2016, the contents of which are hereby incorporated herein by reference—to the extent such contents do not conflict with the present disclosure. The audio information can be stored on the caller's device or elsewhere, such as on server 106. The audio recording can be a one-time or limited-time setup, wherein the caller information is stored. Additionally or alternatively, caller information can be recorded when a call is made. For example, a caller's name may need to be recorded only once or periodically and caller information could include the recorded name alone or with additional information that is made, for example, on a per-call basis. Alternatively, a caller could use a client to record caller information when it is thought that there might be a translation issue, and not use such service if a translation issue is not expected.

The audio information can be stored as an uncompressed (e.g., .wav) file or a compressed (e.g., MPEG-4, or MP3) file or any other suitable file format. The audio information can be recorded by the caller and/or provided by an operator. The information can be recorded and stored in one or more languages. When the information is stored on a remote device, such as a server, the information can be stored along with the corresponding directory number.

During step 204, file location information (e.g., an IP or URL address) corresponding to caller information is provided to a recipient's device. In accordance with various examples of the disclosure, the file location information is provided as part of a call setup. For example, the file location information can be provided as part of a SIP header. The location information can include a location of a server, such as server 106, a location of the caller's device, or another location of a suitable server or device.

A second device (e.g., device 104) can retrieve the audio information during step 206—e.g., using file location information that is transmitted to recipient's device during a call setup. As noted above, the file location can be the caller's device, a server, or another device. When the audio file is on the caller's device, the audio information can directly stream from the caller's device to the recipient's device—e.g., using SIP. Alternatively, the audio file can be transmitted as part of a call setup. Although separately illustrated, steps 202-206 can be part of a call setup process.

A call recipient can play the audio file—e.g., using a client, can have displayed text or an image corresponding to the caller information (e.g., translated text and/or non-translated text corresponding to the audio information), or both during step 208. In accordance with some embodiments of the disclosure, the recipient's device can perform translation of the audio file into a language used by the recipient's device. In accordance with other examples, the translation can occur elsewhere, such as on a server (e.g., server 108).

Figure 3:
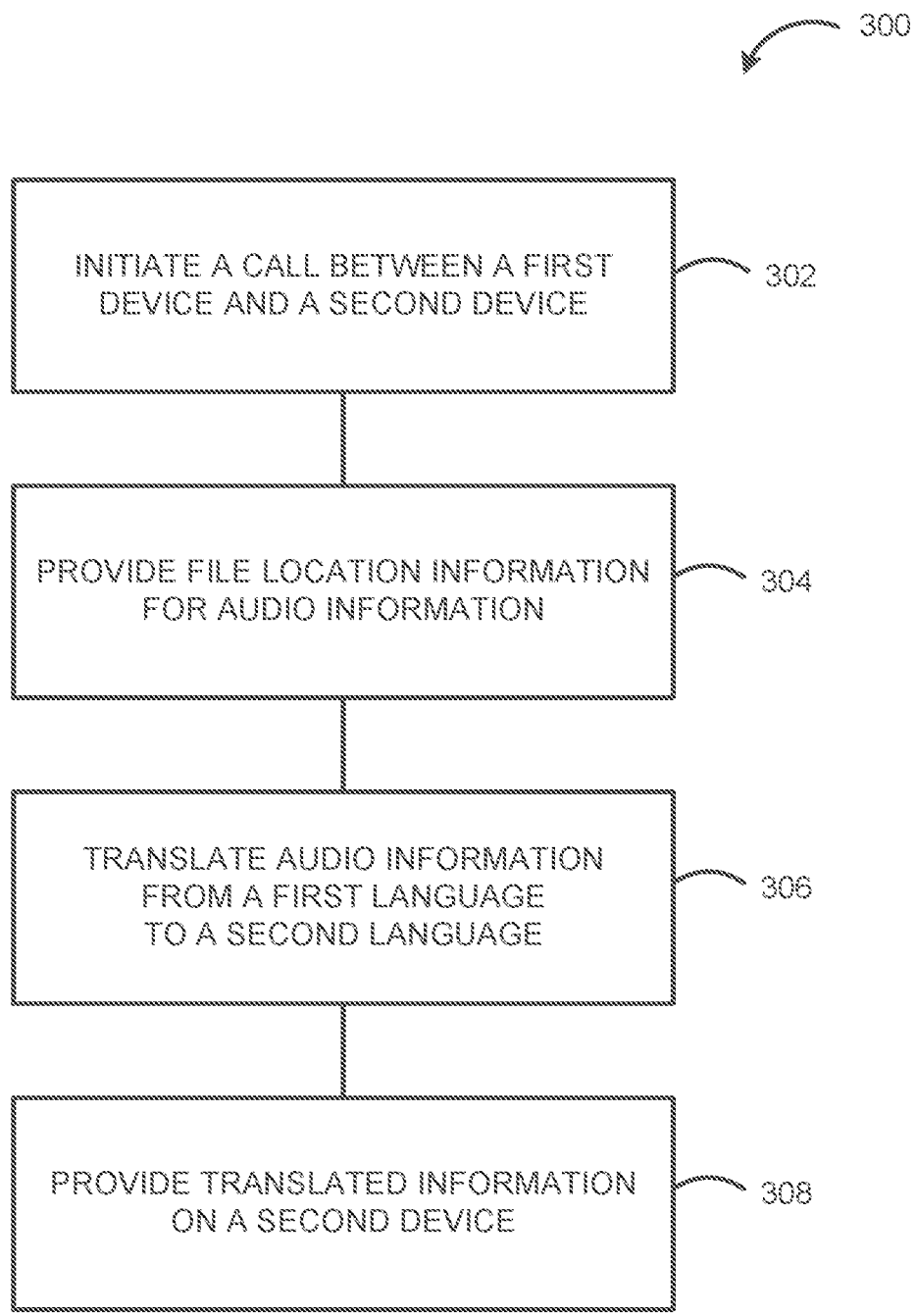
FIG. 3 illustrates another communication method in accordance with further exemplary embodiments of the disclosure.

FIG. 3 illustrates another method 300 of providing caller information in accordance with further examples of the disclosure. Method 300 includes the steps of initiating a call between two or more devices (step 302), providing file location information for audio information that includes caller information (step 304), translating the audio information from a first language to a second language (step 306), and providing (e.g., displaying) the translated information on a recipient's device (step 308).

Steps 302 and 304 can be the same or similar to steps 202 and 204, described above. Step 306 includes translating the audio information. The translation and/or transcription can be performed by, e.g., a recipient's device and/or elsewhere, such as a server—e.g., server 108.

Once the audio information is translated and transcribed, the translated/transcribed information can be displayed, during step 308, on a recipient's device. The information that is displayed can include caller identification (e.g., name, company, or the like) information. The information can be displayed as part of a call setup.

The methods and systems have been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

What is claimed is:

1. A method of providing caller information, the method comprising the steps of:
    initiating a voice-over-Internet (VoIP) call between a first device and a second device;
    during a call setup of the VoIP call, providing file location information corresponding to audio caller identification information recorded in a first language using the first device;
    using the file location information to retrieve the audio caller information;
    transcribing the audio caller identification information to transcribed information in a second language; and
    providing the transcribed information as an image including text in the second language to the second device during a call setup of the VoIP call.

2. The method of claim 1, wherein the step of providing the transcribed information comprises a step of phonetically transcribing the audio information into text in the second language.

3. The method of claim 1, further comprising the step of displaying text of the transcribed audio caller information in the second language.

4. The method of claim 1, further comprising a step of storing the audio caller identification information on a server.

5. The method of claim 1, further comprising a step of storing the audio caller identification information on the first device.

6. The method of claim 1, wherein the file location information is provided to the second device during a Session Initiation Protocol call setup.

7. The method of claim 1, wherein the step of providing the file location information comprises providing a URL address for the audio caller identification information.

8. The method of claim 1, wherein the image including text includes text using a second alphabet, the second alphabet different from an alphabet of the first language.

9. The method of claim 1, wherein the caller identification information is provided as contextual information or as part of contextual information.

10. The method of claim 9, wherein the contextual information is provided as an image.

11. A system for providing caller information, the system comprising:
   a communication network;
   a first device connected to the communication network; and
   a second device comprising a client coupled to the communication network;
   wherein file location information corresponding to caller identification information is provided to the second device during a call setup of a voice-over-Internet (VoIP) call between the first device and the second device, the caller identification information comprising audio caller identification information; and
   wherein the second device is configured to utilize the file location information to retrieve the audio caller information and displays transcribed text of the audio caller information in a second language that has been translated from the first language and corresponding to the audio caller identification information, the transcribed text provided as an image file including text during the call setup.

12. The system of claim 11, further comprising a server, wherein the server stores the audio caller identification information.

13. The system of claim 11, further comprising a server, wherein the server transcribes the audio caller identification information from the first language to text in the second language.

14. A system for providing caller information, the system comprising:
   a communication network;
   a first device connected to the communication network; and
   a second device comprising a client coupled to the communication network, the system configured to:
      initiate a voice-over-Internet (VoIP) call between the first device and the second device;
      during a call setup, provide file location information corresponding to audio caller identification information recorded in a first language using the first device, wherein the second device is configured to utilize the file location information to retrieve the audio caller information and;
      transcribe the audio caller identification information to transcribed information in a second language; and
      provide the transcribed information as an image including text in the second language to the second device during a call setup of the VoIP call during the call setup.

15. The system of claim 14, wherein providing the transcribed information comprises a step of phonetically transcribing the audio information into text in the second language.

16. The system of claim 14, the system further configured to display text of the transcribed audio caller information in the second language on the second device.

17. The system of claim 14, the system further configured to store the audio caller identification information on a server.

18. The system of claim 14, the system further configured to store the audio caller identification information on the first device.

19. The system of claim 14, wherein the file location information is provided to the second device during a Session Initiation Protocol call setup.

20. The system of claim 14, wherein providing the file location information comprises providing a URL address for the audio caller identification information.

* * * * *